United States Patent [19]

Berkowitz

[11] 3,958,889
[45] May 25, 1976

[54] JOINT CONNECTOR FOR CONNECTING TUBES
[75] Inventor: Irving L. Berkowitz, Binghamton, N.Y.
[73] Assignee: Kason Hardware Corporation, Binghamton, N.Y.
[22] Filed: June 8, 1973
[21] Appl. No.: 368,453

[52] U.S. Cl. .............................. 403/172; 52/656; 52/665; 403/292; 403/295; 403/297
[51] Int. Cl.² .......................................... F16B 7/00
[58] Field of Search ........... 403/292, 298, 295, 172, 403/297; 52/656, 665

[56] References Cited
UNITED STATES PATENTS

| | | |
|---|---|---|
| 3,218,097 | 11/1965 | Bowens et al. .................... 403/295 |
| 3,393,483 | 7/1968 | Naillon et al. .................... 403/295 X |
| 3,743,332 | 7/1973 | Sonobet .......................... 403/295 X |
| 3,854,831 | 12/1974 | Gunter ........................... 403/295 X |

Primary Examiner—H. Hampton Hunter
Attorney, Agent, or Firm—Paul J. Sutton

[57] ABSTRACT

This connector or joint fitting comprises a member having a corner or base section from which a plurality of branches, each branch extending at right angles to an adjoining branch or branches. Each of said branches has a rocking lock assembled with said member, and having means to permit a tube to be easily fitted onto said branch, but to lock or retard said tube against being easily pulled off said branch.

8 Claims, 13 Drawing Figures

JOINT CONNECTOR FOR CONNECTING TUBES

Features of this invention are disclosed in my copending application Ser. No. 335,455 filed Feb. 26, 1973 entitled "Joint Fittings for Connecting Tubes" and now abandoned.

This invention relates to joint connectors for connecting tubes. An object of this invention is to provide connectors of the character described having one or more of the following features:

1. Lightweight, hollow, one piece castings.
2. Easy application of the tubes before locking takes place.
3. Interchangeability of component parts.
4. Can be easily assembled onto the tubes.
5. Features the new locking plate, self-locking principle.
6. Friction locking as the fitting is driven onto the tubing.
7. System can work with larger tolerance tubing.
8. Disassembly and reassembly can be achieved by indexing of the tubing 90°.
9. High strength, maximum economy.
10. Many variations can be obtained with use of components.
11. Principle would be good for many sized and shapes of tubing.
12. The system is mass produceable to close tolerance dimensions.

These fittings can be used for making articles of furniture such as tables or other useful and decorative articles.

Another object of this invention is to provide a strong, rugged and durable fitting of the character described which shall be relatively inexpensive to manufacture, and which shall be practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described and of which the scope of invention will be indicated in the following claims.

Figure 1:
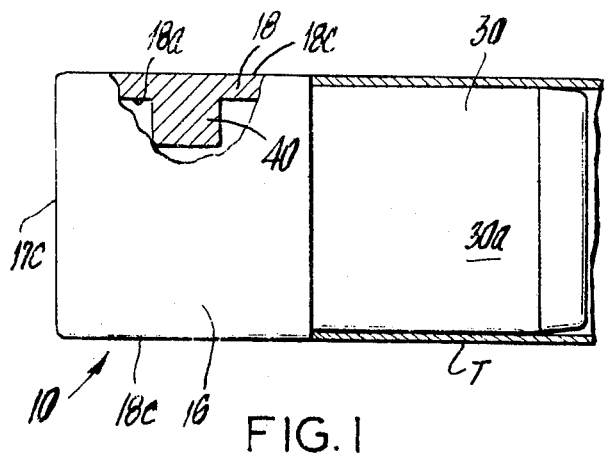
FIG. 1 is a top plan view of an elbow connector embodying the invention.
Figure 3A:
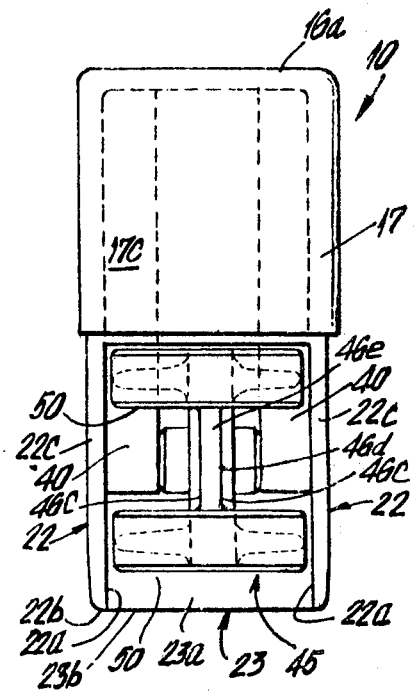
FIG. 3a is an elevational view of the connector shown in FIG. 2, looking at the connector from the left said FIG. 2.

Referring now in detail to FIGS. 1, 2, 3 and 3a of the drawing, numeral 10 designates an elbow connector embodying the invention. Said connector or joint fitting 10 comprises a single casing or member 11 which may be made as a hollow metal casting. Said casting or member 11 comprises a generally, cubic shaped base or corner section 12 from which extends a horizontal branch 13 and a downwardly extending vertical branch 14.

The corner section 12 comprises a top wall 16 from which there extends downwardly, substantially square left side wall 17, substantially square front and rear walls 18, and a substantially square right side wall 19. Walls 17, 18 are of substantially equal thickness and have inner surfaces 17a, 18a, respectiely. Wall 19 has an inner surface 19a facing surface 17a. At the lower ends of walls 17, 18, 19 are coplanar outer undershoulders 17 respectively. 18b, 19b for the purpose hereinafter appearing.

Extending down from walls 18 are parallel walls 22, interconnected by a downwardly extending wall 23. Walls 22 are thinner than walls 18. Walls 22 have inner surfaces 22a which are vertical extensions of surfaces 18a of walls 18. Wall 23 is thinner than wall 19 and has an inner surface 23a which is a downward, vertical extension of surface 19a. Walls 22 have lower edges 22b in the same plane as the lower edge 23b of wall 23. The side walls 22 have left edges 22c spaced inwardly of the outer surface 17c of wall 17 to allow for undershoulder 17b. The walls 22, 23 form a three sided downwardly extending branch 14 open at the bottom and at its left side (looking at FIG. 3).

The walls 22 have outer surfaces 22c spaced inwardly of the outer surfaces 18c of walls 18, to allow for undershoulders 18b. Wall 23 has an outer surface 23c spaced from the inner surface 19a of wall 19 a sufficient distance to allow for undershoulder 19b.

Wall 19 is thicker than walls 16, 17, 18. Extending from wall 19 to the right is a horizontal wall 30 having an upper surface 30a disposed at a somewhat lower level than upper surface 16a of wall 16 to provide a shoulder 30b. The inner surface 30c of wall 30 is in the plane of the inner surface 16b of wall 16. Wall 30 has an outer edge 30d.

Also extending from wall 19 are parallel, vertical, opposed walls 35. Walls 35 have inner surfaces 35a in the planes of the inner surfaces 18a of walls 18. Said walls 35 have lower edges 35b in a plane spaced above the plane of undershoulders 17b, 18b, 19b, and provide a vertical shoulder 35c in the plane of shoulder 30b. said side walls 35 have outer surfaces 35d spaced inwardly of the outer surface 18c of walls 18 to form vertical parallel shoulders 35e in the plane of shoulders 30b and 35c.

Walls 30, 35 form the side outlet or branch 13 for the connector. It is open at the bottom and at its outer end.

The corner section is hollow and has a top wall 16 and downwardly extending walls 17, 18 and 19. The space within the corner section 12 communicates with the space within the lower branch 14.

Figure 2:
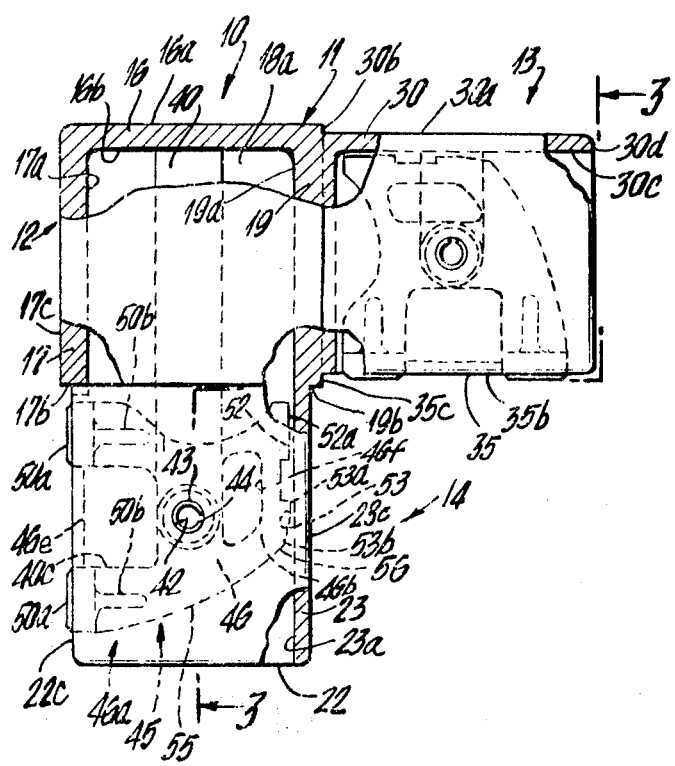
FIG. 2 is a front elevational view of the connector shown in FIG. 1 with parts broken away.
Figure 3:
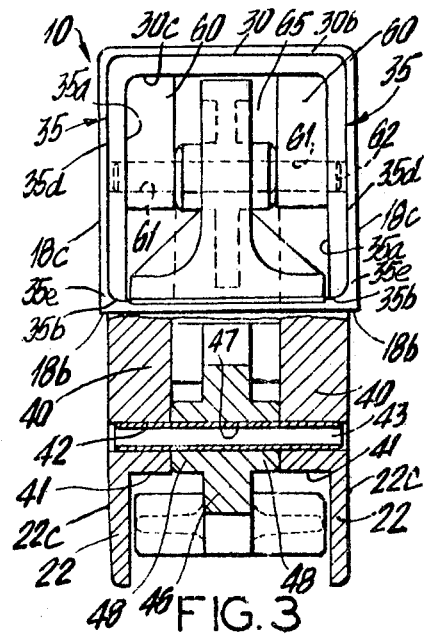
FIG. 3 is a cross-sectional view taken in line 3—3 of FIG. 2.

Integrally formed with the inner coplanar surfaces of walls 18, 22 are central elongated bosses 40 extending from the inner surface 16b of top wall 16 to a point below the centers of walls 22. The lower ends of bosses 40 may be semi-cylindrical as at 41. At the axis of semi-cylindrical ends 41 are horizontally aligned through openings 42 extending also through walls 22. Frictionally fitted into and through openings 42 is a longitudinally split roll pin 43. The outer ends of said pin are below flush on both sides The split or slot 44 in the roll pin faces wall 23 as shown in FIG. 2.

Rotatably mounted for limited movement on the roll pin 43 is a locking member 45 for locking a square tube T fitted onto the branch 14. The tube will have a sliding fit with respect to the outer surfaces of walls 22, 23 on those sides of said branch and with edges 22c of the side walls 22, and when fully mounted on said branch, its outer edges will abut undershoulders 17b, 18b, 19b. As will be explained hereinafter, the locking member 45 is so constructed as to allow the tube to be fitted onto branch 14, easily, but to prevent the tube from being pulled off easily. In fact the attempt to pull the tube off will increase the frictional purchase of the tube on the branch, so that to get to the tube off the branch, the connector will have to be knocked off with a mallet or the like.

To this end, said locking member 45 has a central wall or flange 46 formed with a central opening 47 coaxial with openings 42. At opposite sides of the central wall are spacer hubs 48. The opening 47 passes through hubs 48 as well as through the wall 46. The roll pin 43 passes through opening 47 so that the locking member 45 can rock on pin 43.

Said central wall 46 has a portion 46a extending away from wall 23 toward the open side of branch 14, and a portion 46b extending toward said wall 23. Portion 46a has depressions 46c at opposite sides thereof forming a central thinner web portion 46d. Said central web portion 46d has an outer edge 46e. Extending from portion 46a to opposite sides thereof are a pair of parallel horizontal bars 50 having coplanar surfaces 50a projecting slightly beyond the plane of edges 22c. Bars 50 are joined to portion 46 by reinforcing ribs 50b.

Portion 46b has central depressions 46f on opposite sides thereof to reduce weight. Depressions 46c are also for the purpose of reducing weight of the locking member. Portion 46b has a pair of fingers 52, 53 wih a notch therebetween. The outer surface 52a of finger 52 is coplanar with a portion of the outer surface 53a of finger 53. Surfaces 52a, 53a are parallel to and somewhat spaced from the inner surface 23a of wall 23. Extending from surface 53a is a beveled surface 53b slanted away from surface 23a.

Said locking member 45 has a lower curved edge 55 which extends at one end to the lower end 56 of beveled surface 53b. A horizontal plane through the axis of opening 42 passes above end 56. This construction allows greater angle or rotation of the locking member 45 in a counterclockwise direction, locking at FIG. 2, than in a clockwise direction. Upon rotating the locking member 45 in a clockwise direction, looking at FIG. 2, finger 52 would soon strike the inner surface of wall 23. Rotation of the locking member 45 in a counter clockwise direction is greater because the locking member can rotate until beveled surface 53b strikes the inner surface 23a. A square tube having a sliding fit on branch 14 would first rock locking member in a counter-clockwise direction allowing the tube to slide past the lower bar 50, and then rock back in a clockwise direction until finger 52 contacts inner surface 23a of wall 23. This allows the sleeve to move fully into contact with undershoulders 17b, 18b, 19b. However, if it were desired to pull the sleeve off branch 14, the locking member 45 would rock in a counter-clockwise direction to a greater angular extend, and surface 50a of upper bar 50 would jam against the inner surface of the sleeve a tube to keep it from easily being pulled off. To separate member 10 from such a tube or sleeve fitted on branch 14, member 10 would have to be hammered off by a mallet to replace the tube, it would be expedient to index the tube 90° about its axis and then again fit the tube onto branch 14.

In branch 13, walls 35 are formed with integral, vertical, inner, central bosses 60 extending from the inner surface 30c of wall 30 to a point past the middle of walls 35. Said walls 35 and bosses 60 are formed with a coaxial through openings 61 through which a split roll pin 62 extends. The opposite ends of roll pin 62 are below flush. Rockingly mounted on the portion of the roll pin 62 is a rocker member 65 like rocker member 45 in branch 14. The split in roll pin 62 is at the top as shown in FIG. 2. The locking member in branch 13 is in a position 90°to turned counter-clockwise from the position of the locking member in branch 14. Thus, the bars 50 of the locking member in branch 13 face downwardly and project through the open lower side of said branch.

The fitting of a square tube or sleeve on branch 13 and its removal therefrom is same as for branch 14.

Figure 4:
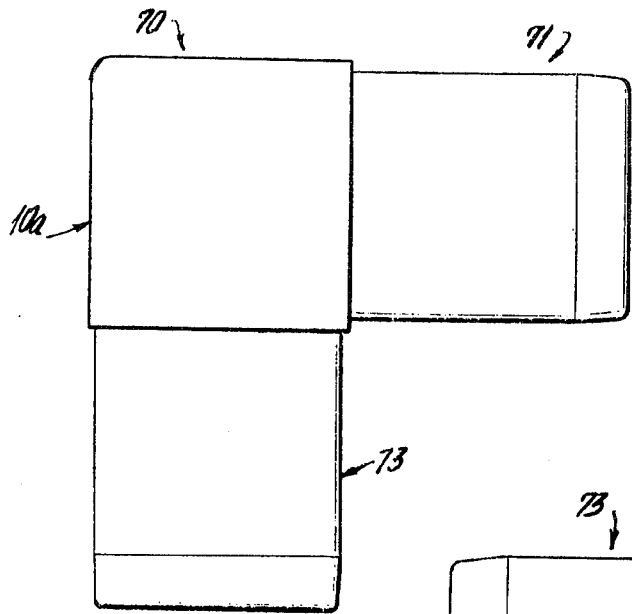
FIG. 4 is a top plan view of an elbow with a side outlet embodying the invention
Figure 6:
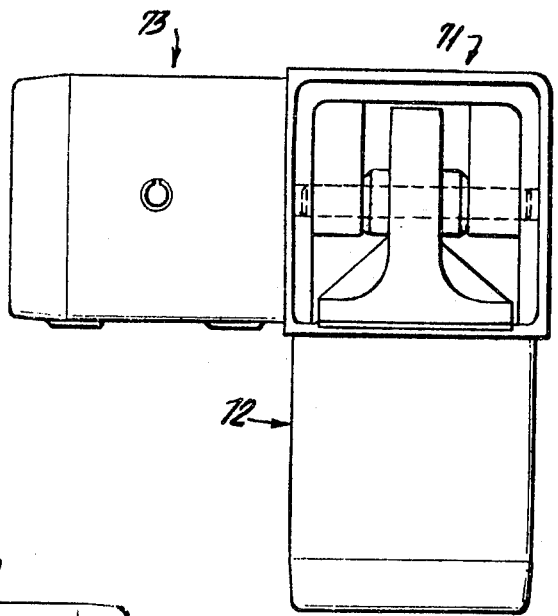
FIG. 6 is an elevational view of the structure of FIG. 5, looking at FIG. 5 from the right thereof.
Figure 5:
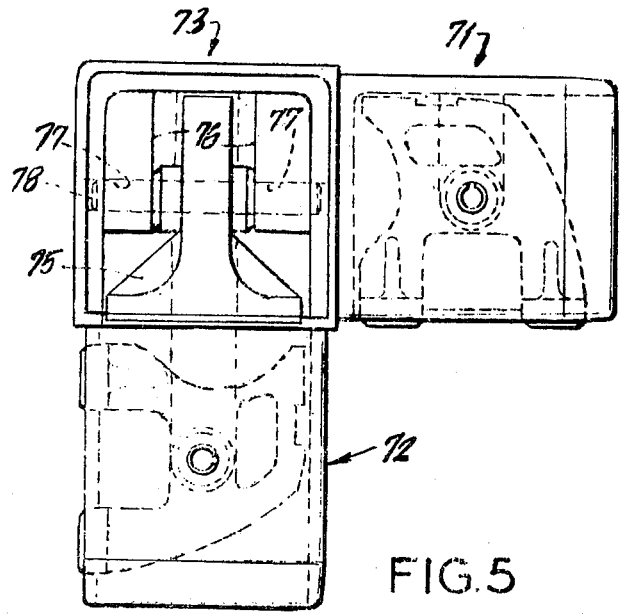
FIG. 5 is a front elevational view of the structure shown in FIG. 4.

In FIGS. 4, 5 and 6 there is shown a joint fitting or connector 10a which is an elbow with one side outlet. It has a corner section 70 like corner section 11 of connector 10, a branch 71 like branch 13, a branch 72 like branch 14 and a horizontal branch 73 extending from the corner branch, at right angles to branch 71. Branch 72 has a locking member like the locking member 45 of branch 14. Branch 71 has a locking member like the locking member 65 of branch 13. Branch 71 has a locking member 75 like the locking member 65 but with the bars 50 at right angles to the bars 50 of locking member 65. The branch 73 is open at the bottom and at its outer end. It has bosses 76 integral with the side walls of the branch 73 formed with through openings 77 for a split roll pin 78 disposed at right angles to the roll pin of branch 71, and on which the locking member of branch 73 is rockingly mounted. The application of a square tube or sleeve on branch 73 is same as on branch 71.

Figure 7:
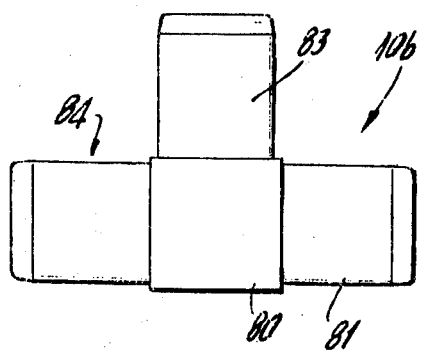
FIG. 7 is a top plan view of a Tee Connector with a side outlet, embodying the invention.
Figure 9:
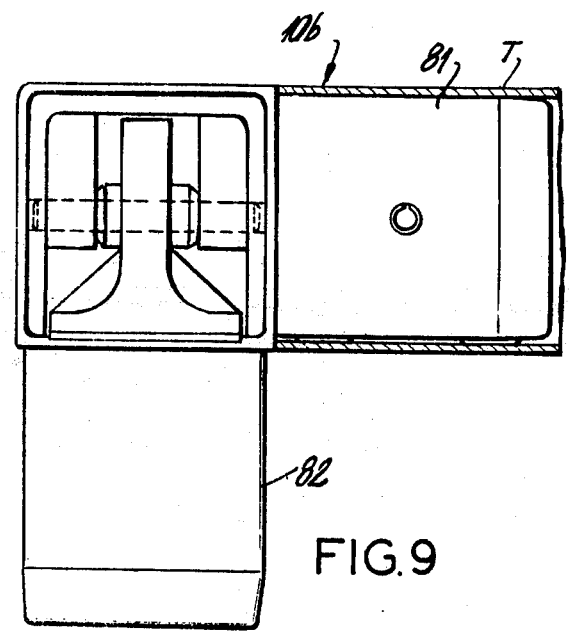
FIG. 9 is a side elevational view the structure of FIG. 8 looking at FIG. 8 from the right side thereof.
Figure 8:
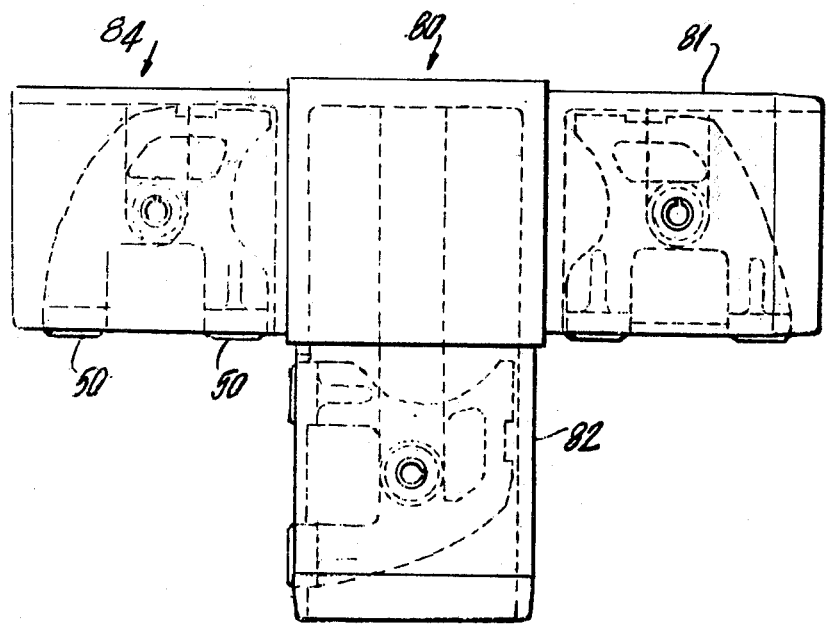
FIG. 8 is a front elevational view of the structure shown in FIG. 7.

In FIGs. 7, 8 and 9 there is shown a fitting or connector 10b which is a Tee-connector with a side outlet and is like the connector 10b, comprising a section 80 like corner section 70, a branch 81 like branch 71, a downwardly extending branch 82 like branch 72, and another branch 84 similar to, but symetrically disposed with respect to, branch 81.

The rocking locking members of branches 81, 82, 83 are same as those of branches 71, 72, 73. Branch 84 has a similar locking member, symmetrical with respect to the locking member of branch 81. Branch 84 is also open at its bottom and outer end, and the bars 50, 50 project down through the lower open side of said branch.

Figure 10:
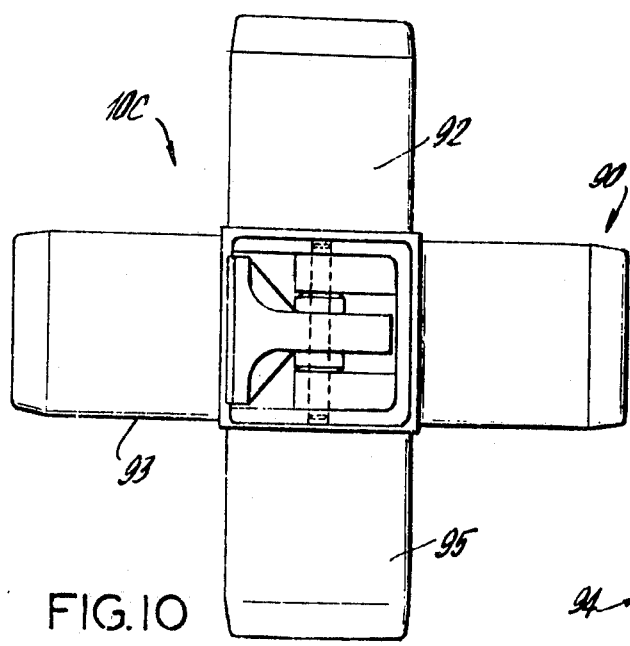
FIG. 10 is a top plan view of a cross connector with side outlets, embodying the invention.
Figure 12:
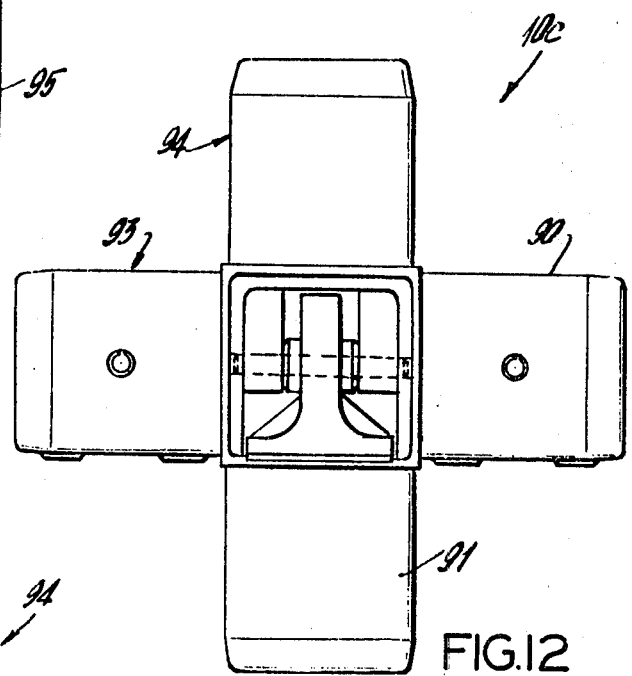
FIG. 12 is a side elevational view of the structure shown in FIG. 11, looking at said FIG. 11 from the right side.
Figure 11:
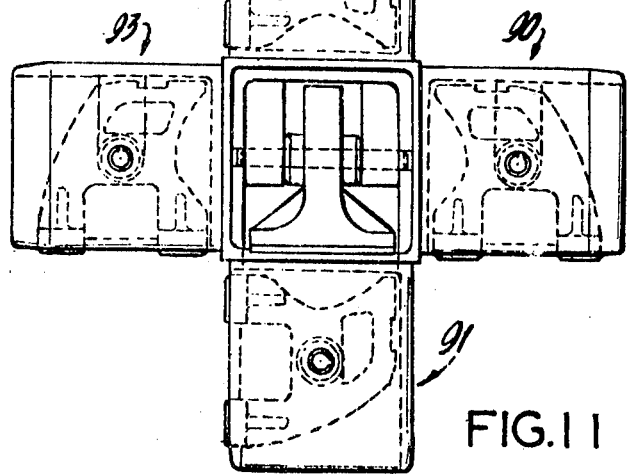
FIG. 11 is a front elevational view of the structure of FIG. 10.

In FIGS. 10–12 of the drawing there is shown a cross with two side outlets assembly, joint fitting or connector 10c. This fitting has a central section (not shown) like section 80, a branch 90 like branch 81 of member 10b, a branch 91 like branch 82, a branch 92 like branch 83, a branch 93 like branch 84 and a branch 94 extending up from the central section, and a branch 95 extending oppositely to branch 92 and which is symmetrically disposed relative thereto. Thus fitting 10c has 6 branches. Branch 95 is open at the bottom and at its outer end like branch 92. Branch 94 is open at its outer end and at one side and is symmetrical with respect to branch 91. Branches 90, 93, 92 and 95 are all open at their lower sides.

It will be noted that in members 10, 10a, 10b and 10c, the corner or central section always communicates with one branch and has five closed sides.

The invention may be embodied in a Tee assembly (not shown). Such an assembly would be like connector 10b (FIGS. 7,8,9) except without branch 83, or a cross assembly (not shown) which would be like connector 10c (FIGS. 10, 11, 12) but with branches 90 and 93 omitted; or a cross with one side outlet assembly (not shown) which would be like connector 10c but with branch 94 omitted It will thus be seen that there is provided an article in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, is to be interpreted as illustrative only.

I claim:

1. A joining device for use in connecting a plurality of tubes, or the like, comprising: a base portion, a plurality of branch portions integral with and extending from said base portion and capable of insertion into said tubes, locking means carried by each of said branch portions for holding said branch portions within a tube, said locking means comprising a body portion having a pair of spaced bearing surfaces and being pivotally supported for limited angular movement between first and second predetermined limit positions, said body portion including first and second rearward surfaces, each adapted to independently engage an inner wall of said branch portion, thereby defining the extent of said limited angular movement, said spaced bearing surfaces projecting from a transverse side of said branch portion, said spaced bearing surfaces being insertable in succession together with said branch portion into a tube whereupon during said insertion a first of said pair of bearing surfaces is substantially freely receivable by the tube and thereafter the second of said pair is only forceably receivable by said tube due to lever action resulting from engagement of said first bearing surface with internal surfaces of the tube.

2. A joining device according to claim 1, wherein said body portion is disposed in one of said predetermined limit positions only upon engagement of one of said rearward surfaces with said inner branch portion wall.

3. A joining device according to claim 1, wherein said first and second surfaces are disposed so as to permit greater angular movement of said body portion in one rotational direction than in the opposite rotational direction.

4. A joining device according to claim 1, wherein said branch portion includes an opening through which said body portion projects.

5. A joining device according to claim 1, wherein said body portion is supported by a pin held by flange portions of said branch portion.

6. A joining device according to claim 1, wherein said branch portion is substantially open at its outer extremity.

7. A joining device according to claim 1, wherein said base portion is formed with at least one external shoulder adapted to be abutted by tubes fitted onto said branch portion.

8. A joining device according to claim 1, wherein said base and branch portions comprise a one-piece casting.

* * * * *